United States Patent
Chandra et al.

(10) Patent No.: US 9,332,439 B2
(45) Date of Patent: May 3, 2016

(54) COEXISTENCE OF WHITE SPACE DEVICES AND WIRELESS NARROWBAND DEVICES

(75) Inventors: Ranveer Chandra, Kirkland, WA (US); Thomas Moscibroda, Redmond, WA (US); George Nychis, Pittsburgh, PA (US); Ivan Tashev, Kirkland, WA (US); Paramvir Bahl, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 747 days.

(21) Appl. No.: 12/962,676

(22) Filed: Dec. 8, 2010

(65) Prior Publication Data

US 2012/0148068 A1    Jun. 14, 2012

(51) Int. Cl.
*H04B 1/04* (2006.01)
*H04W 16/14* (2009.01)
*H04W 52/50* (2009.01)

(52) U.S. Cl.
CPC .............. *H04W 16/14* (2013.01); *H04W 52/50* (2013.01); *H04R 2410/00* (2013.01); *H04R 2420/07* (2013.01)

(58) Field of Classification Search
CPC ... H04W 16/14; H03G 3/3052; H04B 1/1027; H04H 20/30; H04H 60/43; H04N 5/4401; H04R 2410/00; H04R 2420/07
USPC .......................... 381/94.1, 74, 122; 455/114.2
See application file for complete search history.

(56) References Cited

U.S. PATENT DOCUMENTS

| | | | |
|---|---|---|---|
| 8,306,550 B2 * | 11/2012 | Sadek | H03G 3/3052 455/234.1 |
| 2008/0293353 A1 | 11/2008 | Mody et al. | |
| 2009/0124205 A1 | 5/2009 | Aboba et al. | |
| 2010/0022205 A1 | 1/2010 | Henry et al. | |
| 2010/0124254 A1 | 5/2010 | Wu et al. | |
| 2010/0173586 A1 | 7/2010 | McHenry et al. | |
| 2010/0195590 A1 | 8/2010 | Park | |
| 2010/0197317 A1 | 8/2010 | Sadek et al. | |

(Continued)

OTHER PUBLICATIONS

"White Spaces Geolocation Database", Retrieved at << http://www.wirevolution.com/2010/09/24/white-spaces-geolocation-database/ >>, Sep. 24, 2010, pp. 6.

(Continued)

*Primary Examiner* — Edward Urban
*Assistant Examiner* — Max Mathew
(74) *Attorney, Agent, or Firm* — Sandy Swain; Micky Minhas (57) ABSTRACT

Architecture that enables wireless narrowband devices (e.g., wireless microphones) and white space devices to efficiently coexist on the same telecommunications channels, while not interfering with the usability of the wireless narrowband device. The architecture provides interference detection, strobe generation and detection and, power ramping and suppression (interference-free coexistence with spectrum efficiency). The architecture provides the ability of the white space device to learn about the presence of the microphone. This can be accomplished i using a geolocation database, reactively via a strober device, and/or proactively via the strober device. The strober device can be positioned close to the microphone receiver and signals the presence of a microphone to white space devices on demand. The strober device takes into consideration the microphone's characteristics as well as the relative signal strength from the microphone transmitter versus the white space device, in order to enable maximum use of the available white space spectrum.

20 Claims, 5 Drawing Sheets

(56) References Cited

U.S. PATENT DOCUMENTS

| | | | |
|---|---|---|---|
| 2010/0255794 A1 | 10/2010 | Agnew | |
| 2012/0076317 A1* | 3/2012 | Fratti et al. | 381/74 |
| 2012/0106461 A1* | 5/2012 | Kasslin | H04W 16/14 370/329 |
| 2012/0140934 A1* | 6/2012 | Sherwood | H04R 29/00 381/56 |
| 2012/0143406 A1* | 6/2012 | O'Connor | G01C 21/00 701/3 |
| 2012/0185429 A1* | 7/2012 | Shu | H04W 24/08 707/609 |
| 2012/0208558 A1* | 8/2012 | Bajko et al. | 455/456.1 |
| 2012/0274859 A1* | 11/2012 | Knutson | H04L 12/66 348/723 |
| 2013/0054723 A1* | 2/2013 | Jo | H04W 24/00 709/206 |
| 2013/0079046 A1* | 3/2013 | Chen et al. | 455/509 |
| 2013/0103684 A1* | 4/2013 | Yee | H04W 16/14 707/736 |

OTHER PUBLICATIONS

Oxenford, David., "Reconsideration of White Spaces Decision—FCC Approves Unlicensed Devices for "Super Wi-Fi" in TV Band", Retrieved at << http://www.broadcastlawblog.com/tags/interference-to-cable-headend/ >>, Sep. 24, 2010, pp. 3.

"Optimal white space synchronization protocols", U.S. Appl. No. 12/814,394, filed Jun. 11, 2010, pp. 31.

"Transmitting data in a wireless white space network", U.S. Appl. No. 12/796,683, filed Jun. 9, 2010, pp. 39.

"Integrating white space support into a network stack", U.S. Appl. No. 12/822,209, filed Jun. 24, 2010, pp. 25.

"Enabling white space networks independent of low-threshold sensing", U.S. Appl. No. 12/822,218, filed Jun. 24, 2010, pp. 32.

"Spectrum assignment for networks over white spaces and other portions of the spectrum", U.S. Appl. No. 12/473,963, filed May 28, 2009, pp. 50.

"Channel discovery and disconnection in networks over white spaces and other portions of the spectrum", Application No. May 28, 2009, pp. 51.

"Dynamic time-spectrum block allocation for cognitive radio networks", U.S. Appl. No. 12/061,577, filed Apr. 2, 2008, pp. 51.

Jones, et al., "Evaluation of the Performance of Prototype TV-Band White Space Devices", Retrieved at << http://online.wsj.com/public/resources/documents/fcc10152008.pdf >>, OET Report, FCC/OET 08-TR-1005, Oct. 15, 2008, pp. 149.

Flipo, Jerome., "FCC Adopts Rules for Unlicensed Use of Television White Spaces", Retrieved at << http://blogoscoped.com/forum/144221.html >>, Nov. 5, 2008, pp. 4.

Hartman, et al., "Mitigating the Effects of Unlicensed Devices on Wireless Microphones", Retrieved at << http://www.ieee802.org/802_tutorials/05-November/Shure_IEEE_802%2022_Tutorial_Final_110905.pdf >>, Nov. 14, 2005, pp. 1-21.

Commins, John., "FCC Approves Spectrum for 'Super Wi-Fi'", Retrieved at << http://www.healthleadersmedia.com/content/TEC-256857/FCC-Approves-Spectrum-for-Super-WiFi >>, Sep. 24, 2010, pp. 2.

Bahl., et al., "White Space Networking with Wi-Fi like Connectivity", Retrieved at << http://citeseerx.ist.psu.edu/viewdoc/download?doi=10.1.1.147.8847&rep=rep1&type=pdf >>, ACM SIGCOMM Computer Communication Review, SIGCOMM, vol. 39, No. 4, Oct. 2009, pp. 12.

Borth, et al., "Considerations for Successful Cognitive Radio Systems in US TV White Space", Retrieved at << http://ieeexplore.ieee.org/stamp/stamp.jsp?tp=&arnumber=4658272 >>, 3rd IEEE Symposium on New Frontiers in Dynamic Spectrum Access Networks, Oct. 14-17, 2008, pp. 1-5.

Buchwald, et al., "The Design and Operation of the IEEE 802.22.1 Disabling Beacon for the Protection of TV Whitespace Incumbents", Retrieved at http://ieeexplore.ieee.org/stamp/stamp.jsp?tp=&arnumber=4658266 >>, 3rd IEEE Symposium on New Frontiers in Dynamic Spectrum Access Networks, Oct. 14-17, 2008, pp. 1-6.

Narlanka, et al., "A Hardware Platform for Utilizing TV Bands With a Wi-Fi Radio", Retrieved at << http://research.microsoft.com/pubs/73481/lanman07.pdf >>, 15th IEEE Workshop on Local & Metropolitan Area Networks, Jun. 10-13, 2007, pp. 5.

Nychis, et al., "Enabling MAC Protocol Implementations on Software-Defined Radios", Retrieved at << http://www.cs.berkeley.edu/~tbh/papers/mac.pdf >>, Networked Systems Design and Implementation, 2009, pp. 15.

Rahul, et al., "Learning to Share: Narrowband-Friendly Wideband Networks", Retrieved at << http://people.csail.mit.edu/rahul/papers/wideband-sigcomm2008.pdf >>, SIGCOMM, Aug. 17-22, 2008, pp. 12.

Rix, et al., "Perceptual Evaluation of Speech Quality (PESQ)—A New Method for Speech Quality Assessment of Telephone Networks and Codecs", Retrieved at << http://citeseerx.ist.psu.edu/viewdoc/download?doi=10.1.1.5.9136&rep=rep1&type=pdf >>, IEEE International Conference on Acoustics, Speech, and Signal Processing, May 7-11, 2001, pp. 1-4.

Yang, et al., "Supporting Demanding Wireless Applications with Frequency-Agile Radios", Retrieved at << http://www.cs.ucsb.edu/~htzheng/publications/pdfs/jello-nsdi10.pdf >>, 2010, pp. 1-15.

Yu-Chun, et al., "Protection of Wireless Microphones in IEEE 802.22 Cognitive Radio Networks", Retrieved at << http://ieeexplore.ieee.org/stamp/stamp.jsp?tp=&arnumber=5208056 >>, IEEE International Conference on Communications Workshops, Jun. 14-18, 2009, pp. 5.

* cited by examiner

COEXISTENCE OF WHITE SPACE DEVICES AND WIRELESS NARROWBAND DEVICES

BACKGROUND

Federal Communications Commission (FCC) rulings have opened up the possibility of wireless network deployments over vacant UHF (ultra-high frequency) and VHF (very high frequency) television (TV) channels, also commonly known as "white spaces". A key requirement for any white space device under this ruling is that its transmissions do not interfere with incumbents, namely TV transmitters and licensed wireless microphones. The ruling stipulates that devices must learn about occupied TV channels and registered wireless microphones either by sensing or by accessing a geolocation database (e.g., on the Internet).

A concern about the use of white spaces is utilization. This is to a large extent due to the requirement that white space devices must "vacate an entire TV channel", even if there is only a single wireless microphone operating in this TV channel. Given that a TV channel is 6 MHz wide (in the US) or 8 MHz wide (in most other countries), and a microphone occupies only a few 100 KHz, this is a waste of available white spaces.

In urban scenarios and on a campus where there can be several microphones in operation at any given time, the requirement to vacate an entire TV channel whenever there is a microphone operating in this channel can imply that a large fraction of the available white space spectrum is wasted. In extreme cases, it can even lead to scenarios where there is no usable white space spectrum available at all, even though the amount of actually utilized spectrum (by the microphones) would be a tiny fraction of the spectrum.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture enables wireless narrowband devices (e.g., wireless microphones) and white space devices to efficiently coexist on the same telecommunications (e.g., TV) channels, while not interfering with the usability of the wireless narrowband device. The architecture provides interference detection, strobe generation and detection, and power ramping and suppression (interference-free coexistence with spectrum efficiency).

Where the narrowband device is a wireless microphone, white space devices can efficiently coexist on the same TV channel, while not causing audible interference at the microphone. The architecture is designed such that the amount of spectrum the white space device(s) can "reclaim" within an occupied TV channel is maximized based on the relative distances of the wireless microphone to microphone receiver and white space device to microphone receiver. In high-density scenarios where multiple white space devices need to coexist with one or more wireless microphones, the disclosed architecture enables additional white space spectrum to accommodate the high density environment.

A white space device can operate on the same TV channel of a wireless microphone by ceasing transmission in the specific portion of spectrum in which the wireless narrowband device transmits (e.g., suppressing a specific set of PHY-layer subcarriers in OFDM—orthogonal frequency-division multiplexing to avoid causing audible interference at the microphone. The white space device can learn about the presence of the microphone. This can be accomplished in a number of ways such as using a geolocation database, reactively via a strober device, and/or proactively via the strober device. The strober device can be positioned close to the microphone receiver and signals the presence of a microphone to white space devices on demand (before the white space device can cause audible interference to the microphone). The strober device takes into consideration the microphone's characteristics as well as the relative signal strength from the microphone transmitter versus the white space device, in order to enable maximum use of the available white space spectrum.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The unused portions of the UHF (ultra-high frequency) and VHF (very high frequency) spectrum, referred to as "white spaces", provide an opportunity for additional utilization in the increasingly crowded wireless environment. The white spaces include, but are not limited to, 180 MHz of bandwidth available from channel 21 (about 512 MHz) to channel 51 (about 698 MHz), exclusive of channel 37. UHF white spaces are fragmented due to the presence of incumbents (or primary users of the channels). The size of each fragment can vary from one channel to several channels. The amount of fragmentation in the UHF bands depends to a large extent on the density of TV stations, which varies considerably with population density. Thus, rural (and suburban) areas are likely to have larger chunks of available UHF spectrum than urban areas.

In these TV bands, microphones are only permitted to operate under the Federal Communications Commission (FCC) Part 74 rules within the United States, and under similar regulations worldwide. This rule restricts the operation of wireless microphones to at most a 200 KHz wide signal and a maximum transmit power of 250 mW, although most microphones use at most 10 mW. Per the FCC's Second Order and Ruling on white spaces, the microphones are protected by exclusive access to a channel or through registration of wireless microphones in a white space geolocation database. Thus, white space devices (WSDs) are required to vacate a channel that is marked as occupied (e.g., within 400 meters of its location). Moreover, WSDs without access to the geolocation database need to sense for microphones at a detection threshold of minus 114 dBm.

Following is a brief description of the operation of a typical wireless microphone, and some rules governing the protection of wireless microphones from audible interference. A wireless microphone system comprises a microphone transmitter and a microphone receiver. The microphone transmitter converts audio into a radio frequency (RF) using frequency modulation (FM). The microphone receiver decodes the FM signal to retrieve the transmitted audio signal. In idle mode (no input received at the microphone for transmission), the microphone spectrum exhibits generally, three carriers—the center carrier that carries the data, and two side tones (also called squelch tones) that are used to mute the audio recording when there is interference. When there is noise above the squelch tones, the microphone receiver mutes the audio recording. Similarly, if the microphone is muted, the squelch tones are suppressed. Although each microphone has a similar general RF signature when idle, the signal moves around in the frequency spectrum during a microphone recording. Thus, different microphones hop across the spectrum differently during the same recording.

The disclosed architecture includes an assistance component that includes functionality and capabilities in the form of a system, a device, and/or methods that enable the operational coexistence white space devices on the same TV channel of one or more wireless microphones or other narrowband transmitters in white space channels. In the implementation with a wireless microphone, this is accomplished by the WSD ceasing transmission in a specific portion of spectrum in which the narrowband device transmits (e.g., suppressing a small (ideally minimal) number of subcarriers) in order to avoid audible interference at the microphone by ensuring that there is no interference above the squelch tones at the microphone receiver.

For example, the assistance component can comprise a feedback device (also referred to as a strober component) which is placed proximate to the microphone or the microphone receiver (or other narrowband transmitter/receiver in white space spectrum), and which signals the white space device on-demand of the presence of the microphone (before the white space device starts causing audible interference at the microphone). In other words, the feedback device signals impending interference to the white space device. The feedback device can also operate purely reactively and send a strobe signal upon detecting impending interference from any wireless white space device. The feedback device can also operate proactively using a proactive component that "beacons" the presence of a microphone independently of if impending interference exists or does not exist. If the component is reactive, that is, when the strobe device sends a strobe signal to warn the white space device of impending interference at the microphone receiver, the following mechanism can be used to avoid interference. When signaled, using a predefined protocol of on/off key symbols, for example, white space devices ramp up transmission power slowly in order to give the feedback device sufficient time to signal impending interference at each of the steps or discrete power levels. Moreover, the strober signaling technique can communicate information to the white space device to signal where exactly the microphone is.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
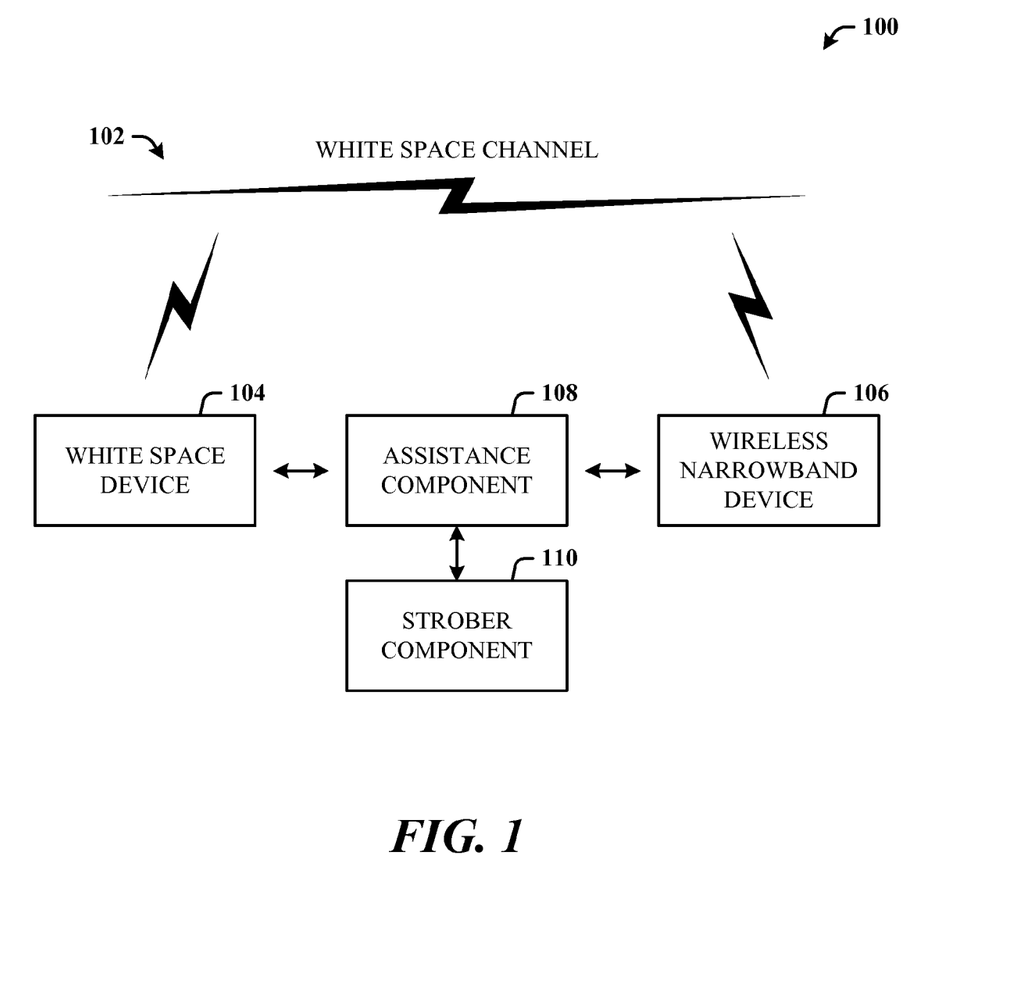
FIG. 1 illustrates a communications system in accordance with the disclosed architecture.

FIG. 1 illustrates a communications system 100 in accordance with the disclosed architecture. The system 100 includes a white space channel 102 on which a white space device 104 and a wireless narrowband device 106 (e.g., wireless microphone, medical devices, etc.) seek to operate. The system 100 also includes an assistance component 108 that assists the white space device 104 in operating on the white space channel 102 concurrently with the wireless narrowband device 106. The assistance component 108 optionally sends notification to the white space device 104 of operating presence of the wireless narrowband device 106 on the white space channel 102. Alternatively, the white space device can learn of the narrowband device via a database. The white space device 104 ceases transmission in a specific portion of spectrum in which the narrowband device transmits to prevent interference with usability of the wireless narrowband device 106. In one implementation, this can be accomplished by suppressing a specific set of physical layer (PHY-layer) subcarriers that is sufficient to prevent interference with usability of the narrowband device 106.

The white space device 104 ramps up transmit power according to discrete power levels, and stops ramp-up when the assistance component 108 signals the white space device 104 of impending interference with the usability of the wireless narrowband device 106. The assistance component 108 comprises or is associated with a strober component 110 that is co-located with or integrated into a receiver of the wireless narrowband device 106 such that the strober component 110 signals the white space device 104 of the impending interference.

In other words, the capabilities attributed to the assistance component 108 include the capabilities of the strober component 110 (also referred to as a feedback device), although some or all of these strober component capabilities may be integrated as part of the wireless narrowband device 106 or be embodied as a separate device co-located with the wireless narrowband device 106. The capabilities attributed to the assistance component also include the ability to retrieve geolocation information about the location of the wireless narrowband device 106, and other information such as make and model of the microphone, center frequency characteristics, receive power parameters, and so on. Again, it is to be understood that these capabilities can be embodied as separate entities or components to the white space device 104, the wireless narrowband device 106, a separate feedback device co-located with the wireless narrowband device 106, or yet another component.

The decision of when the strober component 110 signals the white space device 104 can be based on various pieces of information. For example, in one instantiation, it can be based on received signal power of the wireless narrowband device 106 and interference power of the white space device 104, and optionally, make/model of the wireless narrowband device 106. The wireless narrowband device 106 can be a wireless microphone. The white space device 104 suppresses a small set of OFDM subcarriers (or blocks off a small part of the portion of the spectrum by any other PHY-layer means) to prevent audible interference above squelch tone power levels at a receiver of the wireless microphone (the wireless narrowband device 106). The white space device 104 learns of the presence of the wireless narrowband device 106 via a geolocation database. The assistance component 108 assists the white space device 104 in learning of center frequencies of wireless narrowband devices (e.g., the wireless narrowband device 106) in a vicinity of the white space device 104.

Figure 2:
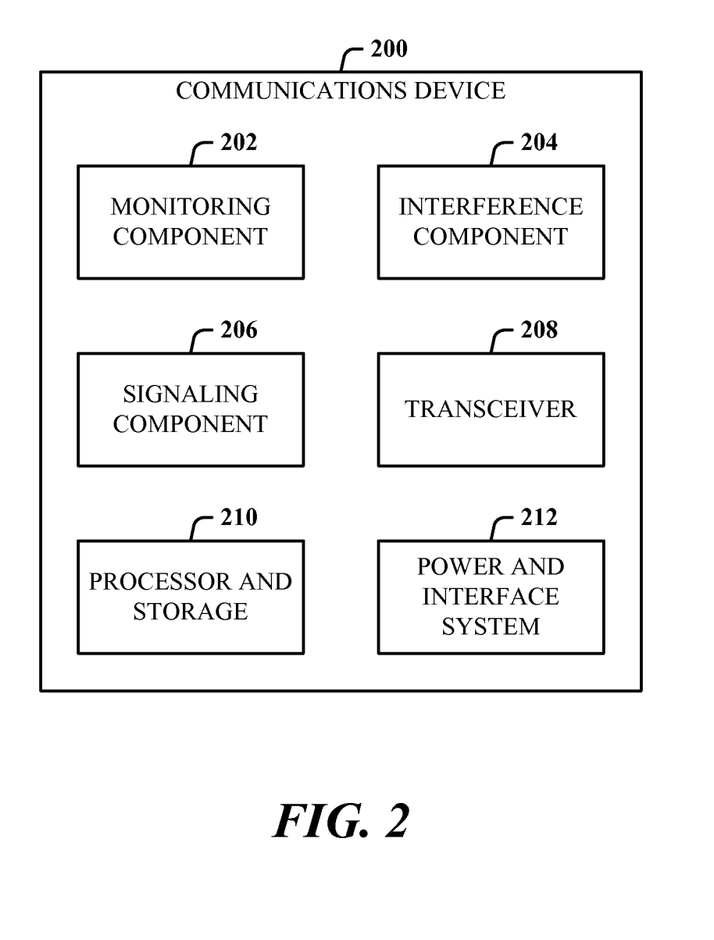
FIG. 2 illustrates a communications device that provides strobing in accordance with the disclosed architecture.

FIG. 2 illustrates a communications device 200 that provides strobing in accordance with the disclosed architecture. The device 200 can include a monitoring component 202 that monitors power parameters related to a white space device and a wireless narrowband device (e.g., microphone) operating on a white space channel. The power parameters include noise power from signal power of the wireless narrowband device and squelch tone power of the wireless narrowband device. The device 200 can also include an interference component 204 that determines impending audible interference to the wireless narrowband device by the white space device based on the power parameters. The device can also include a signaling component 206 that signals the white space device of the impending audible interference.

Other subsystems of the device 200 can include a transceiver 208 for sending and receiving wired and/or wireless signals, a processor and storage 210 to provide processor and storage (e.g., flash memory, programs, and program execution, etc.) support of interference analysis and computation, monitored signal analysis to detect the entry (presence) of the narrowband devices and departure from the white space channel of a narrowband device (e.g., of multiple narrowband devices on the channel), signaling processing to send notification and signaling to the white space device and other processing requirements. A power and interface system 212 provides power, where needed, as well as internal/external interface requirements for the device 200.

The signaling component 206 signals the white space device in response to the determination of the impending interference. The signaling component 206 signals the white space device independent of the determination of the impending interference. The interference component 204 determines the impending audible interference further based on vendor characteristics of the microphone. The signaling component 206 is afforded time to signal the white space device at each level of a power ramp-up by the white space device when determining the impending audible interference. The signaling component 206 signals the white spaces device using narrowband analog signals on both sides of an operational band of the wireless narrowband device. The signal conveys impending interference information, center frequency of the wireless narrowband device, and width of the operational band of the wireless narrowband device.

The disclosed architecture enables WSDs to operate on the same TV channel as a wireless microphone. For most microphones, white space transmissions audibly interfere with the microphone recording when the amplitude of the data signal is greater than the squelch tones of the wireless microphone. If for other microphones, other audible interference thresholds are found, this can be integrated into the strober device, which can then—based on the model and make of the microphone—start sending signals earlier or later, accordingly. Furthermore, this interference persists even when small data packets (e.g., 15 µs long) are sent every 500 ms, as determined by a characterization of audible interference to microphones. Portions of the TV channel that is occupied by a wireless microphone can be reused by ceasing transmission in a specific portion of spectrum in which the wireless microphone transmits and measuring audible interference.

The relationship between RF interference and audible interference on microphones heretofore has not been well-established. Variable RF interference can be characterized by controlling each of the three core components independently: time (duration of interference), power (dBm of interference), and frequency (bandwidth of interference). A strobe device can be adaptive to any specific microphone make/model, and its respective relationship between RF interference and audible interference.

When varying values in the time domain (the duration of interference), fixing the bandwidth of the interference to the width of the TV channel (6 MHz), and transmitting at a power level which exceeds the power of the microphone by 10 dB (as measured at the microphone receiver). It can be determined that interference durations measured at common IEEE 802.11 backoff spacing generate a detrimental amount of audible interference, and even interference as short as four IEEE 802.11a/g/n symbols of interference will create non-negligible amounts of audible interference.

When varying values in the power domain (the interference duration is fixed to be constant throughout the audio recording (worst-case)) it can be determined that independent of the microphone signal power, if the white space noise is above the power of the squelch tones, then audible interference will be created. If the white space noise power is below the squelch tones (e.g., 1 dB or more), zero audible interference will be created even with constant interference in time (worst case).

When varying values in the frequency domain (to evaluate how much spacing in the frequency domain is needed for a microphone system to have zero audible interference), the amount of frequency used by the white space transmission, interference in time and power are fixed. It can then be determined that the amount of interference-free frequency needed by each microphone varies by manufacturer and model, ranging in one scenario from 150 KHz to 325 KHz, for example.

The proximity of the WSD affects the amount of frequency that needs to be suppressed to prevent audible interference at the microphone. In other words, a nearer WSD increases the amount of RF interference leaking onto the microphone signal. This indicates that the number of subcarriers that need to be suppressed, for example, to achieve N-amount of interference-free frequency at the microphone receiver will be dependent on the noise power at the receiver. The amount of frequency suppressed at the transmitter needed to achieve zero audible interference is different depending on the noise power at the receiver. In one example, at a strongest power level of minus 42 dBm, approximately 330 KHz is suppressed at the transmitter, while at a lowest power of minus 67 dBm, only approximately 20 KHz is suppressed. Continuing further, at a power of minus 77 dBm, 0 KHz needs to be suppressed for zero audible interference, since the noise power with relation to the squelch tones is now separated by more than 1 dB.

It can be shown that different microphones require different frequency separation (e.g., up to 325 KHz). This separation value changes depending on the transmit power of the WSD, and the leakage of the radio. However, even in the worst case, the amount of separation is an order of magnitude less than an entire TV channel, which indicates that rather than vacating an entire TV channel as required by existing rules, portions of the TV channel that is in use by a microphone can be reused.

The architecture enables the accurate signaling of the amount of bandwidth that WSDs need to vacate to ensure protection (no audible interference). In one implementation, a device collocated with the microphone receiver signals the WSDs of impending interference. The WSDs then adapt transmission power and/or ceases transmission in a specific portion of spectrum in which the microphone transmits (e.g., suppress more subcarriers). In this way, the WSDs never cause audible interference to microphones. The disclosed architecture ensures no audible interference to wireless microphones in a TV channel while maximizing the amount of spectrum available for white space communication. A WSD can coexist with wireless microphones in the frequency domain without causing audible interference by suppressing only few subcarriers (e.g., hundreds of KHz) or even none at all, and for a given microphone the minimum number of subcarriers that a WSD suppresses depends on its distance from the microphone receiver, as well as received microphone power at the microphone receiver.

White space devices can coexist with microphones by suppressing a sufficient number of subcarriers around the microphone. Thus, a WSD only needs to learn the center frequency (and ideally, also the make and model) of all microphones in its vicinity. There are several ways this information can be learned. Firstly, the FCC requires licensed microphones to be input in the database. From this, every white space device that queries the database learns about the presence of a wireless microphone on the channel, including possibly the microphone's center frequency, make and model, along with GPS coordinates of the microphone. Secondly, WSDs can learn about microphones using the approach traditionally proposed to protect microphones called spectrum "sensing". Unfortunately, such an approach is extremely difficult to implement as it is difficult to distinguish the microphone's signal from noise, and is prone to false positives.

In both approaches, a major challenge is to determine the number of subcarriers the WSD needs to suppress; however, both approaches are spectrum-inefficient. Subcarrier suppression can be accomplished by knowing the distance of the WSD to the microphone receiver, the make of the microphone, and the microphone transmitter's power at the microphone receiver. If a database is accessible that includes center frequency, make, model, and maximum distance between the microphone and receiver, carrier suppression can be performed and a portion of the channel used.

In the proactive approach of microphone beaconing, where the beacon signals the presence of a microphone, WSDs may end up suppressing more than subcarriers for one microphone than necessary; however, this is still more efficient than existing techniques.

To further improve spectrum efficiency, WSDs are required to suppress subcarriers only when likely to cause audible interference with wireless microphones. The architecture explicitly takes into account whether the microphone is close to the microphone receiver, the make of the microphone, as well as the microphone signal strength at the microphone receiver. Thus, no subcarriers are suppressed when the microphone transmitter's signal is much stronger than the WSD signal at the microphone receiver, even though the WSD is within 400 meters of the microphone.

To achieve this functionality, feedback is received from the microphone receiver to determine the two principal unknowns: microphone signal power and noise signal power. This feedback can be provided as a small standalone feedback device positioned proximate the wireless microphone receiver or incorporated into the wireless microphone receiver system. The feedback device can implement a low complexity signaling mechanism which conveys both pieces of information to achieve maximum spectrum efficiency. As a standalone system, the microphone operator inputs the frequency of the microphone to the feedback device. Alternatively, the feedback device can also learn of the frequency automatically from the geolocation database. In one implementation, the WSDs are wideband OFDM systems that use more than 1 MHz of bandwidth. Additionally, the WSDs cooperate with the signals from the feedback device.

The disclosed architecture can be employed as a reactive system. Specifically, the feedback device notifies a WSD, before the WSD transmissions start to create audible interference to the microphone recording. The feedback device is able to do so because it is located close to the microphone receiver, and hence, has accurate information about the received signal power at the microphone receiver, as well as the interference power level caused by WSDs.

In order for the feedback device to have sufficient time to notify a WSD, the WSDs slowly ramp up the transmission power when entering a new channel, and with no feedback yet received from the feedback device(s). Before ramping up the power to the next level, the WSD listens for signals from the feedback device. If the WSD receives such a signal, the WSD either stops ramping up the power further, or suppresses more OFDM subcarriers and begins to ramp up again. If the feedback device again signals, the WSD suppresses additional subcarriers and starts the ramp up again. This procedure continues until the device learns the proper number of subcarriers to suppress in order to protect the microphone.

Additionally, the WSD can continually probe to unsuppress subcarriers if the WSD has not received a periodic signal from the feedback device to notify of a microphone existence. Therefore, the primary job of the feedback device is to signal impending microphone interference to WSDs and to protect the microphone from transmitting noise. The rule that WSDs follow is to abstain from transmitting at full power immediately, but slowly increase the transmission power.

The goal of the disclosed architecture is to notify a WSD of impending audible interference before the interference occurs. As previously indicated, impending audible interference can be detected by deriving power components that the feedback device monitors: the power of the noise, and the power of the squelch tones of the protected microphone. By ensuring the noise power is below the power of the squelch tones (e.g., 1 dB or more below), zero audible interference is achieved. Therefore, the feedback device monitors the noise power and begins to signal of impending interference once this power exceeds the noise threshold (e.g., which is 1 dB below the squelch tones, plus an additional power buffer to allow for fluctuations in the received microphone signal power). This allows a WSD to achieve maximum spectrum efficiency with no audible interference.

Since the FCC restricts narrowband secondaries, secondary interference will be wideband and the noise in the operational band can be estimated by measuring the noise directly outside this band. Thus, two protective bands (e.g., 25 KHz) are created (one on each side of the microphone's operational band) and use these pieces of the spectrum to derive the noise power from the known noise floor.

With respect to thresholding, the noise threshold comprises two components: the power of the squelch tones, and power fluctuation parameter accounting for power fluctuation in the system. The power fluctuation parameter is designed to ensure that chosen transmission power and subcarrier suppression will not create audible interference if the microphone signal power fluctuates throughout the maximum length of a transmission.

While guaranteed not to interfere, the WSD may still exceed the noise detection threshold during the transmission, for which it will be signaled directly afterwards. If the noise threshold is lower than the noise floor, the system enters a reactive state to constantly signal of possible interference to prevent power ramping.

To derive the squelch tone power in the noise threshold, the power of the squelch tones can be tracked according to units of time (e.g., every 4 ms). This protects against a continuously fluctuating system, which can create inefficiency in spectrum utilization, forcing the WSD back into the power and subcarrier suppression probe state. The power fluctuation parameter accounts for the power fluctuations inbetween squelch tone updates.

The power fluctuation parameter can be derived according to typical microphone use at a common distance between the microphone and microphone receiver. The amplitude separation of the squelch tones is measured from the noise floor in three environments—static, human interference, and aggressive mobility. The maximum change in amplitude is then derived over the time period (e.g., a 4 ms unit). In one embodiment, the power fluctuation parameter can be set to a minimum of 10 dB to account for small timescale variation.

The mechanism for signaling to the WSDs is simple, robust, and efficient. The signaling protocol is narrowband to be spectrum efficient and does not interfere with other microphones. That said, the mechanism signals at least two pieces of information: impending interference with microphones and, the center frequency and width of operation of the wireless microphone. In one implementation, narrowband analog signals in the protective bands (described above), are 25 KHz wide. This narrowband signaling helps in reaching out to WSDs that may be sending at much higher power, but over a larger bandwidth of one or more TV channels. By using an analog signaling mechanism, no complexity is introduced in supporting standard protocols and only needs carrier sensing-like functionality. By raising the analog signals on both sides of the microphone's operational band, the center frequency and width of the microphone can be conveyed. From this, the WSD can quickly determine the center frequency, and accordingly, suppress subcarriers.

In one implementation, rather than using constant tones around the microphone's operational band, strobing is introduced, which is a signaling mechanism that uses OOK (on-off keying), a technique similar to Morse code. Otherwise, multiple constant analog signals (e.g., of 25 KHz) may be indistinguishable to determine the start of one microphone operational band and another's (which tone starts or ends a band), and can make such power indistinguishable from spectrum fragments of secondary WSDs.

The design of the strobe is to quickly raise and lower the power of the analog signals with a predefined spacing between the on-symbols and off-symbols, and a total time to transmit such power. To delineate the start and end of a microphone's band, two separate predefined strobing rates can be used. To ensure that strobes do not mimic common protocol behavior, as well as be quickly detectable, the on-period and off-period can be varied on the order of tens of microseconds.

An on-symbol can be defined to be a period of time in which there is power in the protective bands and an off-symbol defined to be a period of time in which the state of the transmitter is off. A single strobe-symbol comprises both the on-symbol and off-symbol, and the total time of the strobe-symbol is defined by the interval. In one implementation, four different intervals can be employed. The first two intervals signal an impending-interference signal to the WSD; where the first interval in this set marks the start of the operational band, and the second marks the end of the operational band. The second pair of intervals conveys a low signal message to the WSD, when the microphone's received signal strength at the receiver is below the power fluctuation parameter power buffer for ramping up. This notifies devices in the channel that there is a low power microphone, and every WSD must take a highly conservative suppression decision.

Strobe generation can be obtained using what is referred to as a linear power ramping cyclic prefix (LPR CP), which significantly eliminates leakage into the microphone band. The LPR CP is a linearly power scaled (via amplitude scaling of the complex samples) version of the on-symbol, appending before and after the each on-symbol or off-symbol. In one embodiment, LPRCP=2 on-symbols removes leakage, and software scaling of the complex sample amplitude can be used to achieve this.

Detecting the strobes (a strobe detector) is performed using a carrier-sensing like functionality, where the WSD is attempting to detect power changes at specific periods in 25 KHz bins. To do this, the WSD buffers enough samples to compute an FFT (fast Fourier transform) of a size that produces frequency bins as close to 25 KHz as possible. Each bin contains the power at the given frequency, from which simple binary power detection in each bin can be performed. The strobe detector detects the four different strobe signals, two of which delineate the start and stop of the microphone operational band for a normal impending-interference (IM) signal, and the other two strobe signals delineate the start and stop of the band for a low-power (LP) signal. In terms of on-and-off symbols, these four sequences can be defined as follows: LPs=[1,0,1,0, . . . ], IMs=[1,1,1,0,0,0, . . . ], LPe=[1,1,0,0,1, 1,0,0, . . . ] and IMe=[1,1,1,1,0,0,0,0, . . . ].

All sequences are unbounded in time. Once a sequence begins transmission, the sequence does not stop until the interference power of the WSD is lowered below the threshold, or the power of the microphone signal improves beyond the low-power threshold. In this way, false negatives are reduced by giving the WSD time to react.

A WSD assumes an IM strobe signal is directed toward it if the strobe is detected immediately after a transmission. Even if incorrectly identified as being directed towards an improper WSD, the WSD can quickly regain the spectrum by backing down a power level and ramping up one step again. To detect these sequences, a history buffer of size N (e.g., N=32) stores FFT results (e.g., one result every 41 µs). Each 25 KHz bin can be convolved with only two of the four strobe signals: LPs and IMs.

Correlation on LPe and IMe is only performed if their respective start sequence was detected. This reduces the complexity of the detection algorithm. If correlating to one of the start sequences (LPs or IMs), then only sixteen frequency bins forward are looked at (assuming a 350 KHz maximum microphone bandwidth).

These computations can be greatly parallelized in hardware. In hardware, it may be less complex to parallelize the convolution of all four sequences across the FFT bins, rather than implement conditional logic on the convolutions.

The disclosed architecture probes to find the optimal number of subcarriers to suppress based on feedback from the signaling mechanism (e.g., strobing). Probing for the optimal number of subcarriers to suppress can be performed without interfering by leveraging the RF noise tolerance due to the squelch tones. To do so, all WSD ramp up their power in steps when first entering a channel with no knowledge of microphones and without having received feedback (e.g., strobes) from them.

At each step in ramping up its power, the WSD transmits a short packet using its active subcarriers. If not signaled by any microphone (where multiple microphones are on the channel), such that the WSD power across all active subcarriers in this level did not exceed some threshold below the squelch tones, then the WSD steps to the next power level and transmits again. If the WSD receives a strobe signal from some microphone, the WSD either (1) reduces its transmit power to the level at which the WSD was not strobed or (2) adjusts its active subcarriers, and repeats transmission at the current power level. If the WSD takes the latter choice, if it is strobed again, the WSD must again take either choice (1) or (2) again. Once the WSD is not strobed by any feedback device (or similar mechanism) at the given power level and subcarrier suppression, the WSD can step to the next power level or activate more subcarriers. The process repeats until the device is at its desired power level with an active number of subcarriers to achieve optimal spectrum efficiency.

Since the strobes surround the operational band of the microphone, the WSD will know the center frequency around which the WSD can begin suppressing the subcarriers. Slowly ramping up power (e.g., 1 dB levels) and suppressing subcarriers allows more direct convergence. Moreover, over time, the feedback device can probe to add subcarriers back. To do so, the WSD steps down one power level (1 dB) and adds a subcarrier to each side. If the WSD finds this successful, the WSD can continue adding until it receives strobes, in which case, the WSD will back-off in the frequency domain. By doing so, microphones that dynamically enter and leave the spectrum will not impact the spectrum efficiency.

The WSD transmitter slowly ramps up its transmission power, and backs off once the feedback device signals the WSD of interference, without ever exceeding the power of the squelch tones. The feedback device monitors the power of the squelch tones and adapts its threshold accordingly. The feedback device reports the noise power, squelch tone power, and noise threshold. In one example, the WSD can be configured to step-up power in 1 dB intervals, and then listen for a strobe between each interval step. In one example, the listen mode can be 2 ms periods between steps. If implemented in hardware, the ramp up time can be on the order of hundreds of microseconds, thereby allowing ample to time detect and react to a strobe. The full ramp-up period is only performed when entering a channel or a new microphone enters the channel.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
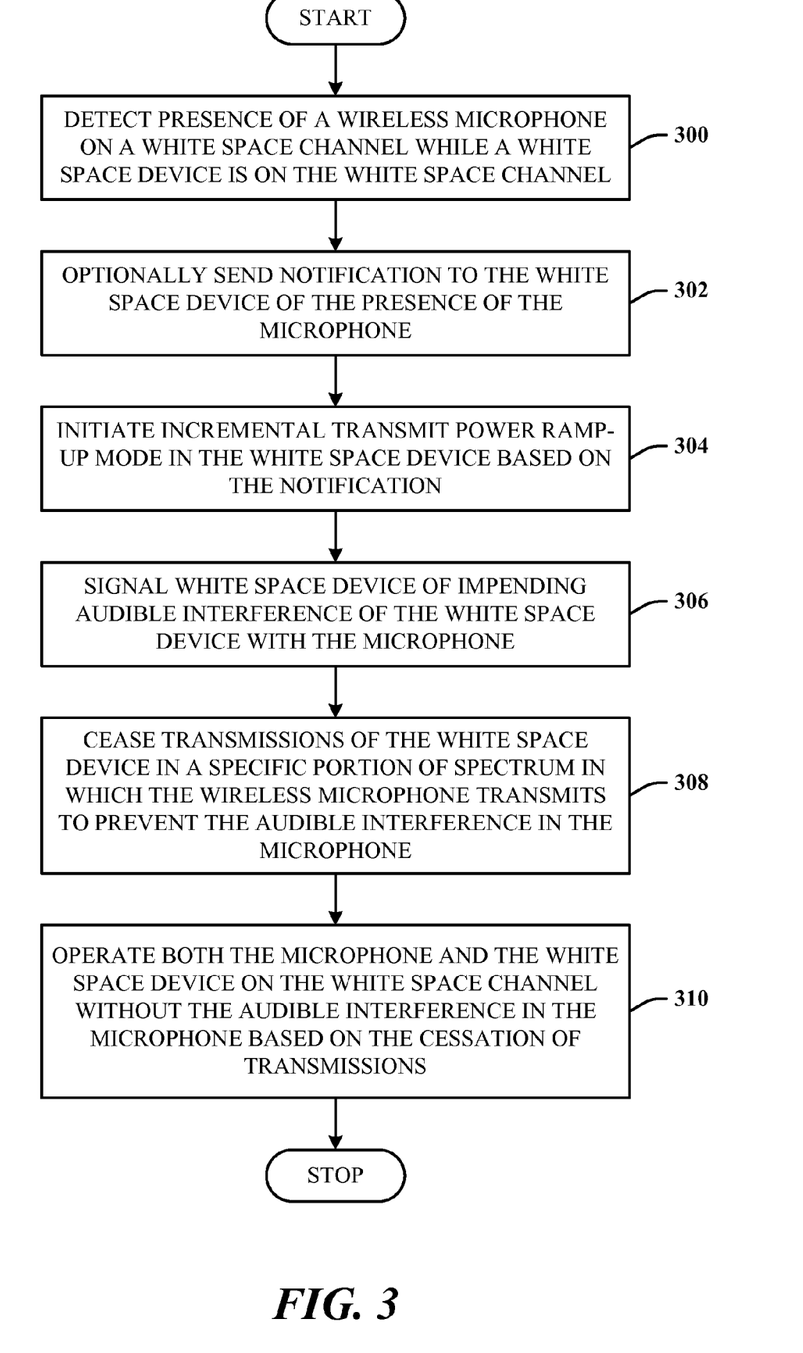
FIG. 3 illustrates a communications method in accordance with the disclosed architecture.

FIG. 3 illustrates a communications method in accordance with the disclosed architecture. At 300, presence of a wireless microphone on a white space channel is detected while a white space device is on the white space channel. At 302, a notification is optionally sent to the white space device of the presence of the microphone. At 304, an incremental transmit power ramp-up mode is initiated in the white space device based on the notification. At 306, the white space device is signaled of impending audible interference of the white space device with the microphone. At 308, transmissions of the white space device in a specific portion of spectrum in which the wireless microphone transmits are ceased to prevent the audible interference in the microphone. At 310, both the microphone and the white space device are operated on the white space channel without the audible interference in the microphone based on the cessation of transmissions.

Figure 4:
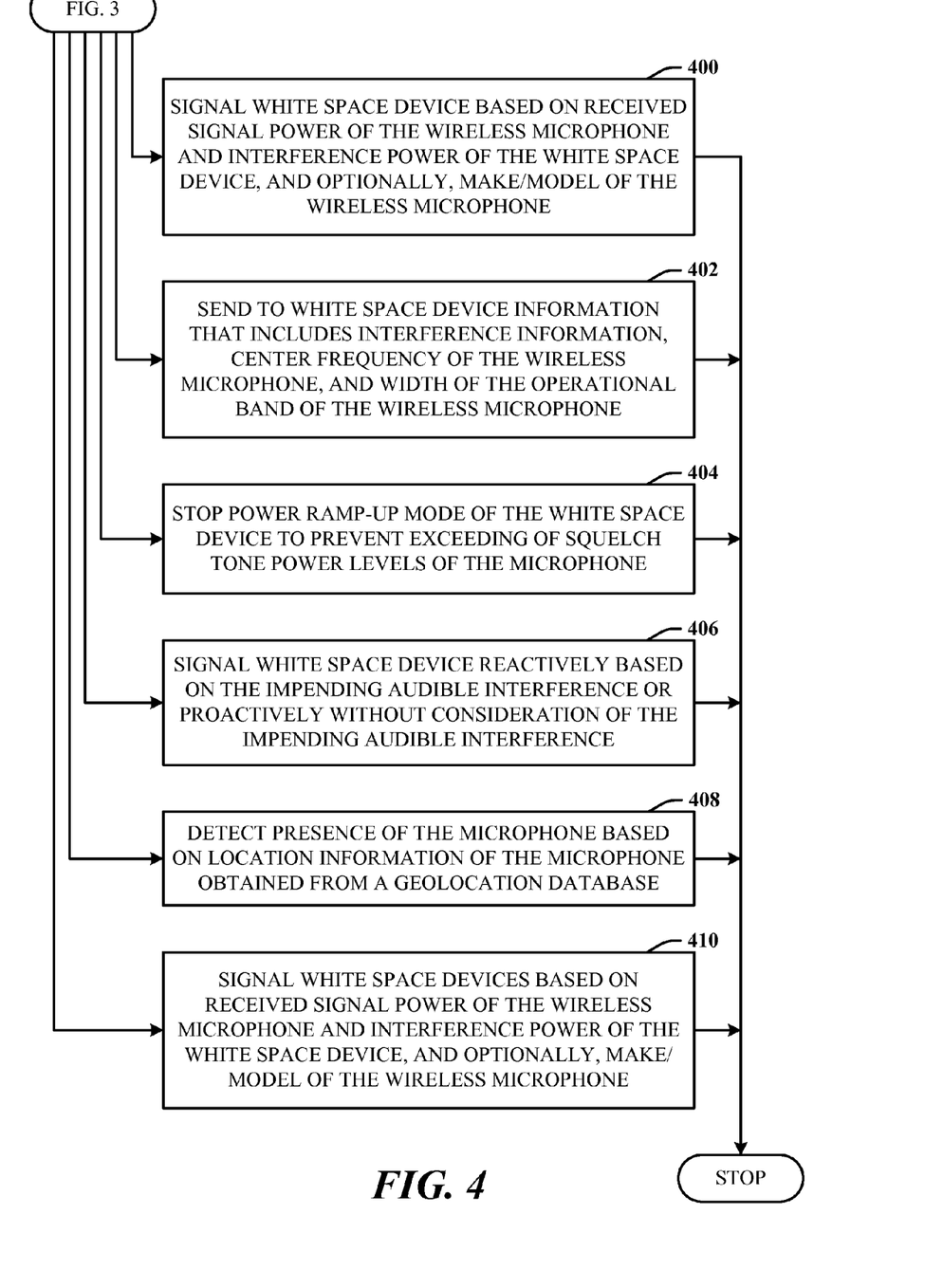
FIG. 4 illustrates further aspects of the method of FIG. 3.

FIG. 4 illustrates further aspects of the method of FIG. 3. Note that the flow indicates that each block can represent a step that can be included, separately or in combination with other blocks, as additional aspects of the method represented by the flow chart of FIG. 3. At 400, the white space device is signaled based on received signal power of the wireless microphone and interference power of the white space device, and optionally, make/model of the wireless microphone. At 402, information is sent to the white space device that includes interference information, center frequency of the wireless microphone, and width of the operational band of the wireless microphone. At 404, the transmit power ramp-up mode of the white space device is stopped to prevent exceeding of squelch tone power levels of the microphone. At 406, the white space device is signaled reactively based on the impending audible interference or proactively without consideration of the impending audible interference. At 408, the presence of the microphone is detected based on location information of the microphone obtained from a geolocation database. At 410, the white space device signaled based on received signal power of the wireless microphone and interference power of the white space device, and optionally, make/model of the wireless microphone.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 5:
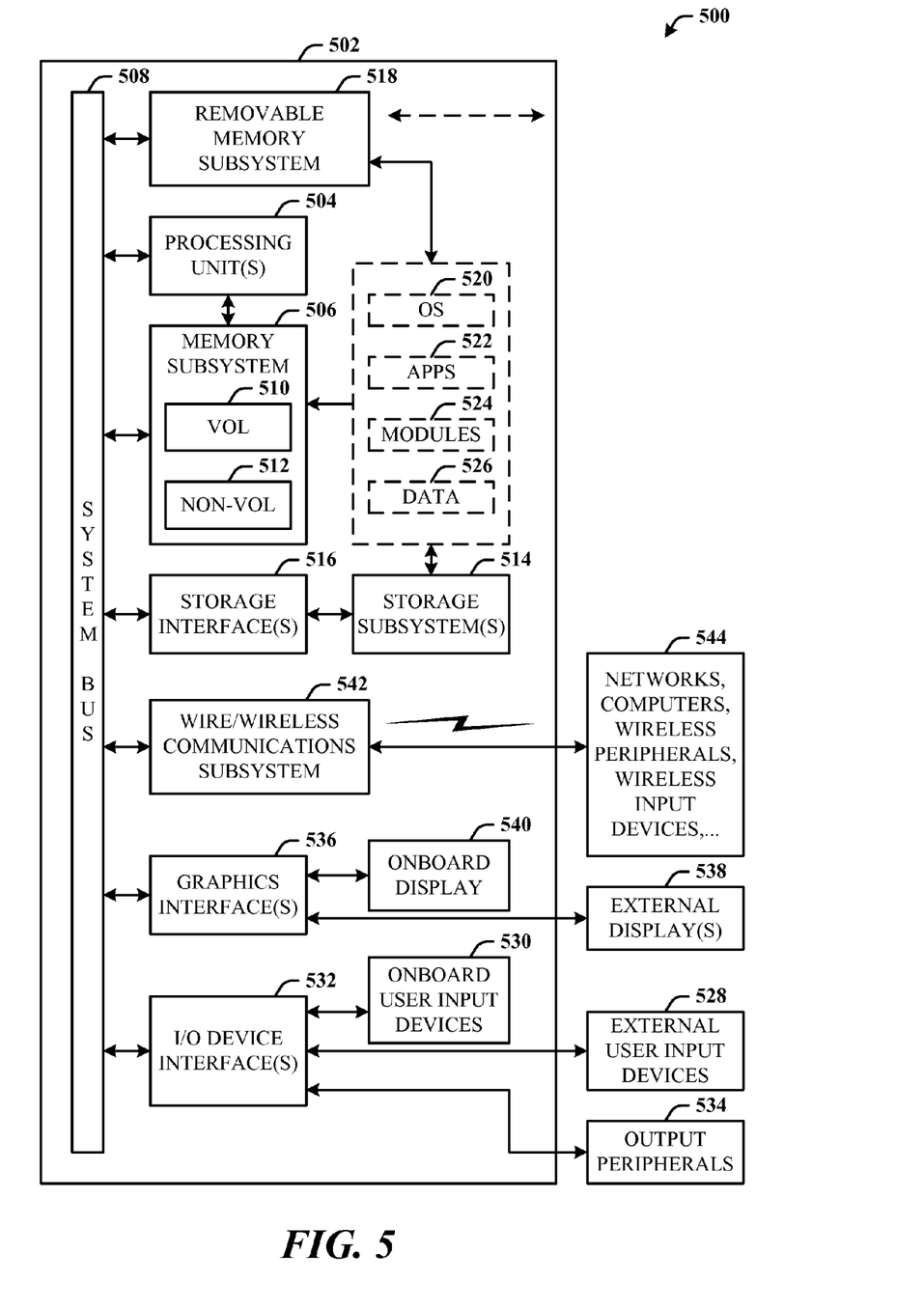
FIG. 5 illustrates a block diagram of a computing system that executes assistance functionality and capabilities in accordance with the disclosed architecture.

Referring now to FIG. 5, there is illustrated a block diagram of a computing system 500 that executes assistance functionality and capabilities in accordance with the disclosed architecture. However, it is appreciated that the some or all aspects of the disclosed methods and/or systems can be implemented as a system-on-a-chip, where analog, digital, mixed signals, and other functions are fabricated on a single chip substrate. In order to provide additional context for various aspects thereof, FIG. 5 and the following description are intended to provide a brief, general description of the suitable computing system 500 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 500 for implementing various aspects includes the computer 502 having processing unit(s) 504, a computer-readable storage such as a system memory 506, and a system bus 508. The processing unit(s) 504 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 506 can include computer-readable storage (physical storage media) such as a volatile (VOL) memory 510 (e.g., random access memory (RAM)) and non-volatile memory (NON-VOL) 512 (e.g., ROM, EPROM, EEPROM, etc.). A basic input/output system (BIOS) can be stored in the non-volatile memory 512, and includes the basic routines that facilitate the communication of data and signals between components within the computer 502, such as during startup. The volatile memory 510 can also include a high-speed RAM such as static RAM for caching data.

The system bus 508 provides an interface for system components including, but not limited to, the system memory 506 to the processing unit(s) 504. The system bus 508 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 502 further includes machine readable storage subsystem(s) 514 and storage interface(s) 516 for interfacing the storage subsystem(s) 514 to the system bus 508 and other desired computer components. The storage subsystem(s) 514 (physical storage media) can include one or more of a hard disk drive (HDD), a magnetic floppy disk drive (FDD), and/or optical disk storage drive (e.g., a CD-ROM drive DVD drive), for example. The storage interface(s) 516 can include interface technologies such as EIDE, ATA, SATA, and IEEE 1394, for example.

One or more programs and data can be stored in the memory subsystem 506, a machine readable and removable memory subsystem 518 (e.g., flash drive form factor technology), and/or the storage subsystem(s) 514 (e.g., optical, magnetic, solid state), including an operating system 520, one or more application programs 522, other program modules 524, and program data 526.

The one or more application programs 522, other program modules 524, and program data 526 can include the entities and components of the system 100 of FIG. 1, the entities and components of the system 200 of FIG. 2, and the methods represented by the flowcharts of FIGS. 3 and 4, for example.

Generally, programs include routines, methods, data structures, other software components, etc., that perform particular tasks or implement particular abstract data types. All or portions of the operating system 520, applications 522, modules 524, and/or data 526 can also be cached in memory such as the volatile memory 510, for example. It is to be appreciated that the disclosed architecture can be implemented with various commercially available operating systems or combinations of operating systems (e.g., as virtual machines).

The storage subsystem(s) 514 and memory subsystems (506 and 518) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 502 and includes volatile and non-volatile internal and/or external media that is removable or non-removable. For the computer 502, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 502, programs, and data using external user input devices 528 such as a keyboard and a mouse. Other external user input devices 528 can include a microphone, an IR (infrared) remote control, a joystick, a game pad, camera recognition systems, a stylus pen, touch screen, gesture systems (e.g., eye movement, head movement, etc.), and/or the like. The user can interact with the computer 502, programs, and data using onboard user input devices 530 such a touchpad, microphone, keyboard, etc., where the computer 502 is a portable computer, for example. These and other input devices are connected to the processing unit(s) 504 through input/output (I/O) device interface(s) 532 via the system bus 508, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 532 also facilitate the use of output peripherals 534 such as printers, audio devices, camera devices, and so on, such as a sound card and/or onboard audio processing capability.

One or more graphics interface(s) 536 (also commonly referred to as a graphics processing unit (GPU)) provide graphics and video signals between the computer 502 and external display(s) 538 (e.g., LCD, plasma) and/or onboard displays 540 (e.g., for portable computer). The graphics interface(s) 536 can also be manufactured as part of the computer system board.

The computer 502 can operate in a networked environment (e.g., IP-based) using logical connections via a wired/wireless communications subsystem 542 to one or more networks and/or other computers. The other computers can include workstations, servers, routers, personal computers, microprocessor-based entertainment appliances, peer devices or other common network nodes, and typically include many or all of the elements described relative to the computer 502. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 502 connects to the network via a wired/wireless communication subsystem 542 (e.g., a network interface adapter, onboard transceiver subsystem, etc.) to communicate with wired/wireless networks, wired/wireless printers, wired/wireless input devices 544, and so on. The computer 502 can include a modem or other means for establishing communications over the network. In a networked environment, programs and data relative to the computer 502 can be stored in the remote memory/storage device, as is associated with a distributed system. It will be appreciated that the network connections shown are exemplary and other means of establishing a communications link between the computers can be used.

The computer 502 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A communications system, comprising:
a white space channel on which a white space device and a wireless narrowband device seek to operate; and
an assistance component that assists the white space device in operating on the white space channel concurrently with the wireless narrowband device, by:
sending notification to the white space device of operating presence of the wireless narrowband device on the white space channel, in response to which the white space device initiates an incremental transmit power ramp-up mode, and
signaling the white space device of impending audible interference of the white space device with the wireless narrowband device, in response to which the white space device ceases transmission in a specific portion of spectrum in which the narrowband device transmits to prevent interference with usability of the wireless narrowband device, the specific portion of spectrum being substantially less than an entire channel portion of spectrum that is specifically associated with the white space channel.

2. The system of claim 1, wherein the white space device ramps up transmit power according to discrete power levels, and stops ramp-up when the assistance component signals the white space device of impending interference with the usability of the wireless narrowband device.

3. The system of claim 2, wherein the assistance component comprises a strober component that is co-located with or integrated into a receiver of the wireless narrowband device such that the strober component signals the white space device of the impending interference.

4. The system of claim 3, wherein the strober component signals the white space device based on received signal power of the wireless narrowband device and interference power of the white space device, and optionally, make/model of the wireless narrowband device.

5. The system of claim 1, wherein the wireless narrowband device is a wireless microphone, wherein the white space device ceases transmission in the specific portion of spectrum in which the narrowband device transmits to prevent audible interference above squelch tone power levels at a receiver of the wireless microphone.

6. The system of claim 1, wherein the white space device learns of the presence of the wireless narrowband device via a geolocation database.

7. The system of claim 1, wherein the assistance component assists the white space device in learning of center frequencies of wireless narrowband devices in a vicinity of the white space device.

8. A communications method, comprising acts of:
detecting presence of a wireless microphone on a white space channel while a white space device is on the white space channel;
sending a notification to the white space device of the presence of the microphone;
initiating an incremental transmit power ramp-up mode in the white space device based on the notification;
signaling the white space device of impending audible interference of the white space device with the microphone;
in response to the signaling of the impending audible interference, ceasing transmissions of the white space device in a specific portion of spectrum in which the wireless microphone transmits to prevent the audible interference in the microphone, the specific portion of spectrum being substantially less than an entire channel portion of spectrum that is specifically associated with the white space channel; and
operating both the microphone and the white space device on the white space channel without the audible interference in the microphone based on the cessation of transmissions.

9. The method of claim 8, further comprising signaling the white space device based on received signal power of the wireless microphone and interference power of the white space device, and optionally, make/model of the wireless microphone.

10. The method of claim 8, further comprising sending to the white space device information that includes interference information, center frequency of the wireless microphone, and width of the operational band of the wireless microphone.

11. The method of claim 8, further comprising stopping the power ramp-up mode of the white space device to prevent exceeding of squelch tone power levels of the microphone.

12. The method of claim 8, further comprising signaling the white space device reactively based on the impending audible interference or proactively without consideration of the impending audible interference.

13. The method of claim 8, further comprising detecting the presence of the microphone based on location information of the microphone obtained from a geolocation database.

14. The method of claim 8, further comprising signaling the white space device based on received signal power of the wireless microphone and interference power of the white space device, and optionally, make/model of the wireless microphone.

15. A method comprising:
receiving, by a white space device, from an assistance component that assists the white space device in operating on a white space channel concurrently with a wireless narrowband device, notification of operating presence of the wireless narrowband device on the white space channel;
initiating, by the white space device, an incremental transmit power ramp-up mode, in response to receiving the notification;
detecting. by the white space device, a signaling, by the assistance component, of impending audible interference of the white space device with the wireless narrowband device;
in response to the signaling, ceasing, by the white space device, transmission in a specific portion of spectrum in which the narrowband device transmits to prevent interference with usability of the wireless narrowband device, the specific portion of spectrum being substantially less than an entire channel portion of spectrum that is specifically associated with the white space channel.

16. The method of claim 15, wherein the white space device ramps up transmit power according to discrete power levels.

17. The method of claim 15, wherein the white space device stops the transmit power ramp-up mode when the assistance component signals the white space device of impending interference with the usability of the wireless narrowband device.

18. The method of claim 15, wherein the white space device stops the transmit power ramp-up mode to prevent exceeding of squelch tone power levels of a microphone.

19. The method of claim 15, wherein the assistance component assists the white space device in learning of center frequencies of wireless narrowband devices in a vicinity of the white space device.

20. The method of claim 15, wherein the assistance component comprises a strober component that signals the white space device of the impending audible interference.

* * * * *